(12) United States Patent
Lühr

(10) Patent No.: US 10,530,890 B2
(45) Date of Patent: Jan. 7, 2020

(54) METHOD FOR ASSIGNING A USER PROFILE OF A USER TO A SEAT IN A MOTOR VEHICLE, MOBILE UNIT AND MOTOR VEHICLE

(71) Applicant: VOLKSWAGEN AG, Wolfsburg (DE)

(72) Inventor: Kord Lühr, Wolfenbüttel (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 15/687,447

(22) Filed: Aug. 26, 2017

(65) Prior Publication Data

US 2018/0063277 A1    Mar. 1, 2018

(30) Foreign Application Priority Data

Aug. 29, 2016 (DE) .................. 10 2016 216 201

(51) Int. Cl.
| | |
|---|---|
| *H04L 29/08* | (2006.01) |
| *G08B 5/22* | (2006.01) |
| *H04W 4/48* | (2018.01) |
| *B60R 16/037* | (2006.01) |

(52) U.S. Cl.
CPC ............ *H04L 67/306* (2013.01); *G08B 5/221* (2013.01); *H04L 67/12* (2013.01); *H04W 4/48* (2018.02); *B60R 16/037* (2013.01)

(58) Field of Classification Search
CPC ....... H04L 67/306; H04L 67/12; H04L 67/34; G08B 5/221; H04W 4/046; H04W 4/023; H04W 4/48; B60R 16/037; B60R 25/245; E05F 15/77

USPC ........................................................ 340/10.3
See application file for complete search history.

(56) References Cited

U.S. PATENT DOCUMENTS

| | | | |
|---|---|---|---|
| 9,358,940 B2 | 6/2016 | Cooper et al. | |
| 2006/0244312 A1* | 11/2006 | Ogino ................... | B60R 25/257 307/9.1 |
| 2015/0149042 A1* | 5/2015 | Cooper .................. | B60R 16/037 701/48 |

FOREIGN PATENT DOCUMENTS

| | | | | |
|---|---|---|---|---|
| DE | 102010005883 A1 | 7/2011 | | |
| DE | 102014207807 A1 | 10/2015 | | |
| EP | 2751788 A1 * | 7/2014 | ........... | B60R 16/037 |
| KR | 101866732 B1 * | 6/2018 | | |

* cited by examiner

*Primary Examiner* — Yong Hang Jiang
(74) *Attorney, Agent, or Firm* — Barnes & Thornburg LLP

(57) ABSTRACT

A method for assigning a user profile of a user to a seat in a motor vehicle by at least one mobile unit, wherein the mobile unit has at least one identifier and a sensor arrangement for detecting at least one translational and/or rotational degree of freedom, wherein the mobile unit transmits the identifier to the motor vehicle, wherein the mobile unit or the motor vehicle evaluates the data from the sensor arrangement as to whether a boarding movement into a motor vehicle is occurring, wherein the motor vehicle or the mobile unit by the data of a door opening sensor arrangement, assigns the boarding movement to a seat assigned to a vehicle door, wherein the user profile is then assigned to the seat. Also disclosed is a mobile unit and a motor vehicle.

14 Claims, 3 Drawing Sheets

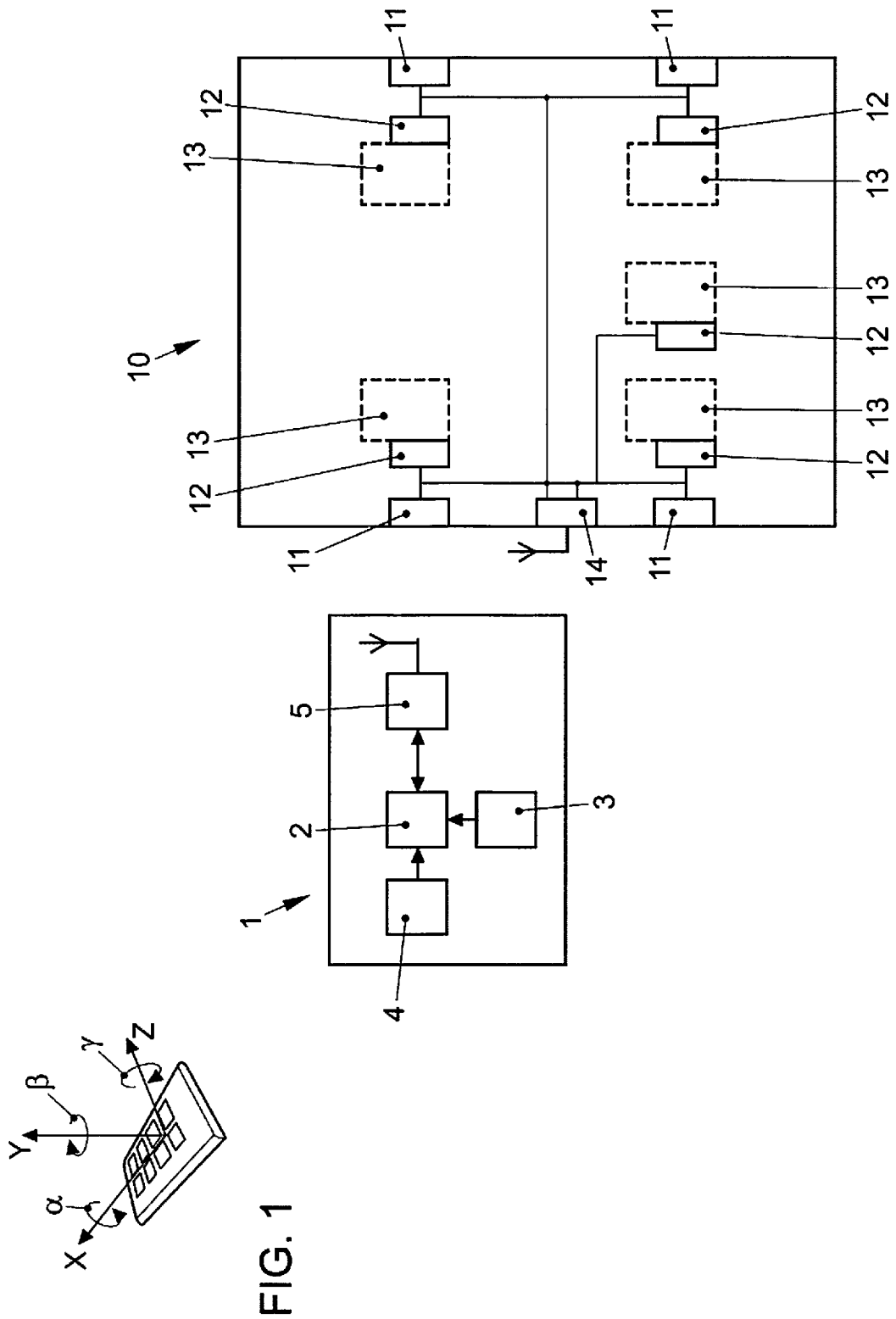

METHOD FOR ASSIGNING A USER
PROFILE OF A USER TO A SEAT IN A
MOTOR VEHICLE, MOBILE UNIT AND
MOTOR VEHICLE

PRIORITY CLAIM

This patent application claims priority to German Patent Application No. 10 2016 216 201.2, filed 29 Aug. 2016, the disclosure of which is incorporated herein by reference in its entirety.

SUMMARY

Illustrative embodiments relate to a method for assigning a user profile of a user to a seat in a motor vehicle, a mobile unit, and a motor vehicle.

BRIEF DESCRIPTION OF THE DRAWINGS

The disclosed embodiments will be discussed in more detail below with reference to the drawings. In the figures:

FIG. 1 shows a mobile unit with the six degrees of freedom;

FIG. 2 shows a schematic block diagram of a mobile unit and of a motor vehicle;

DETAILED DESCRIPTION

Figure 3:
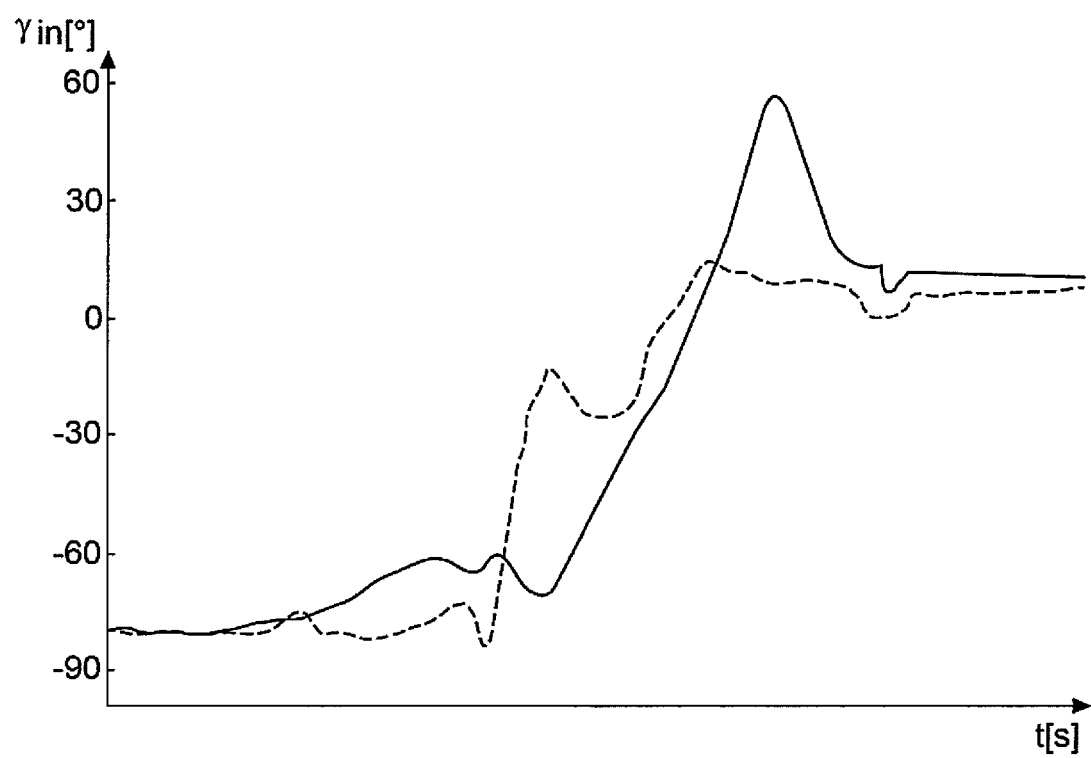
FIG. 3 shows exemplary profiles of the pitch angle during boarding movements.

It is known for a user profile to be stored for users of a motor vehicle, which user profile comprises, for example, seat and/or mirror adjustment settings, air-conditioning system settings, music desires etc., which are then automatically set when the user is identified by the motor vehicle. Normally, the user is the motor vehicle driver, wherein the identification is performed by an identifier of the vehicle key.

DE 10 2014 207 807 A1 has disclosed a method and a system for the personalized assistance of a driver of a vehicle. Here, it is provided that the identified driver is assigned a user profile, wherein, for identification, use is made, for example, of an iris identification mechanism or a fingerprint sensor. Provision is furthermore made for the driver to be assigned a different user profile depending on a state. The state may, for example, be detected by sensors for measuring the skin temperature, humidity, body movements or accelerations etc.

Use may also be made of sensors which are part of a mobile terminal, for example, of a smartphone. By suitable applications executed on the terminal, it is then, for example, possible for the movement behavior of the driver to be detected even over a relatively long time period and/or outside the vehicle (for example, by a health or sport application). This also encompasses the possibility of detecting movements of the driver during sleep (for example, by a sleep phase alarm clock application), from this, to draw conclusions regarding his or her degree of tiredness.

DE 10 2010 005 883 A1 has disclosed a device for the user-specific provision of at least one function for a user, which device has a mobile unit which stores user data of the user. Here, the user data are transmitted via a background system to a controllable device which makes the functions available to the respective user individually in a manner dependent on the transmitted user data of the user. The controllable device may in this case also be a motor vehicle or a vehicle seat. Here, identification or authentication of the user may be performed on the basis of the behavior of the user, for example, on the basis of a movement behavior. Provision may furthermore be made to calculate a future movement profile from the previous movement profile. For example, from this, a prediction can be generated as regards when a service technician is situated at a device in need of servicing.

U.S. Pat. No. 9,358,940 B2 has disclosed a method for assigning a user profile of a user to a seat in a motor vehicle, by at least one mobile unit. The mobile unit has at least one identifier and a sensor arrangement for detecting at least one translational and/or rotational degree of freedom, wherein the mobile unit transmits the identifier and the user profile to the motor vehicle. Here, various approaches are disclosed as regards how the mobile unit is assigned to a vehicle seat. For example, the acoustic signals of the mobile units are evaluated. Alternatively, use is made of magnetic field sensors, or else a correlation between movement data of a seat occupancy sensor with movement data of the mobile unit.

The disclosure is based on the technical problem of providing an alternative method for assigning a user profile of a user to a seat in a motor vehicle. A further technical problem is that of creating a suitable mobile unit and a suitable motor vehicle.

Disclosed embodiments provide a method, a mobile unit, and a motor vehicle.

The method for assigning a user profile of a user to a seat in a motor vehicle is performed by at least one mobile unit, wherein the mobile unit has at least one identifier and a sensor arrangement for detecting at least one translational and/or rotational degree of freedom, wherein the mobile unit transmits the identifier to the motor vehicle. The mobile unit or the motor vehicle evaluates the data from the sensor arrangement as to whether a boarding movement into a motor vehicle is occurring. The motor vehicle or the mobile unit, by the data of a door opening sensor arrangement, assigns the boarding movement to a seat assigned to a vehicle door, wherein the user profile is then assigned to the seat. Correspondingly, it is then possible for the settings contained in the user profile, such as, for example, seat settings, air-conditioning system settings, media settings etc., to be automatically set by the motor vehicle. In this case, complex additional sensing of the mobile units in the motor vehicle can be dispensed with. The assignment is performed by the assignment of the data of the door opening sensor arrangement to the boarding movement. Here, the boarding movement can logically occur only when the vehicle door has been opened. Secondly, the boarding movement must be completed before the vehicle door is closed. By virtue of the temporal assignment of the boarding movement (determined from the data from the sensor arrangement for the detection of at least one translational and/or rotational degree of freedom) to the door opening and possibly closing, it is then possible in a very simple manner, without additional sensor arrangements, to determine a seat assigned to the user profile.

The mobile unit may in this case be a smart phone, a smartwatch or a similar device worn or carried by the user. Here, it is pointed out that there is no universal boarding movement, it rather being the case that the data from the sensor arrangement differ depending on where the mobile unit is worn by the user (for example, left-hand or right-hand trouser pocket, breast pocket, handbag etc.). However, regardless of the location of the mobile unit, the sensor arrangement provides a characteristic profile from which a boarding movement can be inferred regardless of individual peculiarities of individual users during the boarding process.

Provision may also be made for signals from other sensor arrangements already provided in the motor vehicle to be additionally used for checking the plausibility of the assignment to a seat. For example, a seatbelt fastener sensor arrangement may additionally be evaluated. Thus, if a boarding movement is detected and subsequently (normally after a closing process of the door) a fastening of a seatbelt is detected, this is indicative of a correct assignment. It is additionally or alternatively also possible for the data from a seat detection mechanism to be used for plausibility checking.

The evaluation and assignment of a seat may in this case be performed exclusively in the mobile unit, which for this purpose requires only the data from the door opening sensor arrangement. Alternatively, the assignment is performed in the motor vehicle, which for this purpose requires only the data from the sensor arrangement for the detection of the translational and/or rotational degrees of freedom (and possibly identifier and user profile from the mobile unit). Finally, the assignment may be performed in the motor vehicle, wherein the boarding movement is detected by the mobile unit.

In at least one disclosed embodiment, the motor vehicle transmits a trigger signal to the mobile unit, whereupon the mobile unit activates the sensor arrangement for the detection of at least one translational and/or rotational degree of freedom and/or commences the evaluation for the detection of a boarding movement. The benefit of a trigger signal of a motor vehicle is that the user does not need to remove the mobile unit from a pocket, for example. The trigger signal may in this case be output, for example, in a manner dependent on a GPS signal of the mobile unit or in a manner dependent on a detection of the mobile unit within the range of a WLAN or BLUETOOTH® signal. For example, the motor vehicle has a beacon which generally transmits its identifier over a limited range of a few meters, wherein then, the identifier of the beacon is detected by the mobile unit when the mobile unit is situated within the range of the beacon.

Here, provision may furthermore be made for the motor vehicle and mobile unit to be linked in advance, which may take place, for example, upon purchase, rental, during travel in the motor vehicle or at the invitation of an authorized person. The linking may, for example, consist in the mobile unit receiving information regarding the nature and/or frequency of the trigger signal and/or of the door opening signal. The motor vehicle may, for example, receive information regarding the nature and/or frequency of the information from the mobile unit in advance.

In a further disclosed embodiment, at least two rotational degrees of freedom are evaluated for the detection of a boarding movement, because these have proven to be particularly sensitive, and the pitch angle provides very authoritative signals which can then be evaluated together with a roll and/or yaw angle. The angles as rotational degrees of freedom may be determined by a gyroscope. The translational degrees of freedom may be determined by acceleration sensors, wherein it is desirable for all six degrees of freedom to be used for the evaluation.

In a further disclosed embodiment, the user profile is stored on the mobile unit and is transmitted to the motor vehicle. This way, the user profile can be used for different motor vehicles. It is, however, basically possible for the user profile to be stored in the motor vehicle or to remain stored there after the transmission.

In a further disclosed embodiment, the data from the sensor arrangement for the detection of at least one translational and/or rotational degree of freedom are, after detection of a boarding movement, evaluated to detect a movement of the user to a different seat. It is thus possible for movements along a seat bench into a middle position to be detected.

The mobile unit has at least one identifier and a sensor arrangement of at least one translational and/or rotational degree of freedom, wherein the mobile unit is designed to transmit the identifier to a motor vehicle and to determine a boarding movement into a motor vehicle from the data from the sensor arrangement, or to transmit the data from the sensor arrangement to the motor vehicle.

The motor vehicle is designed to assign a use profile of a user to a seat in the motor vehicle, wherein the motor vehicle is furthermore designed to receive an identifier of a mobile unit, wherein the motor vehicle is formed with a door opening sensor arrangement. The motor vehicle is furthermore designed to receive, from a mobile unit, data from a sensor arrangement for detecting at least one translational and/or rotational degree of freedom and to determine a boarding movement from the data, or to receive a detected boarding movement from a mobile unit, wherein the motor vehicle, by the data from the door opening sensor arrangement, assigns the boarding movement to a seat assigned to a vehicle door, wherein the use profile is then assigned to the vehicle seat, or the motor vehicle transmits the data from the door opening sensor arrangement to the mobile unit and receives the assignment from the mobile unit. With regard to the further refinements of the mobile unit and of the motor vehicle, reference is made to the statements given above regarding the method.

FIG. 1 illustrates a mobile unit 1 with the three translational degrees of freedom X, Y and Z and the three rotational degrees of freedom $\alpha$, $\beta$ and $\gamma$. $\alpha$ is in this case a rotational angle about the x axis, and is also referred to as roll angle. $\beta$ is a rotational angle about the y axis and is also referred to as yaw angle. $\gamma$ is a rotational angle about the z axis, and is also referred to as pitch angle.

FIG. 2 illustrates a block diagram of a mobile unit 1 and of a motor vehicle 10, wherein, in the exemplary embodiment illustrated, the evaluation is performed entirely in the mobile unit 1. The mobile unit 1 has an evaluation unit 2, a sensor arrangement 3 for the detection of at least one translational and/or rotational degree of freedom, a memory 4, and a transmitter/receiver unit 5. A user profile with user-specific settings, and an identifier, are stored in the memory 4. The sensor arrangement 3 may detect all six degrees of freedom and, for this purpose, has three acceleration sensors for the x, y and z directions and a gyroscope for the three angular accelerations.

The motor vehicle 10 has four vehicle doors, four door opening sensor arrangements 11, and further sensor arrangements 12 which are assigned to a respective vehicle seat or seat 13. The further sensor arrangements 12 are, for example, seatbelt fastener sensor arrangements and/or seat detection sensor arrangements. The sensor arrangements 11, 12 are connected to a transmitter/receiver unit 14 of the motor vehicle 10, which also comprises a beacon.

The beacon periodically transmits a beacon signal with the identifier of the motor vehicle 10, wherein the range is limited to a few meters (for example, 3-10 m), such that the electrical requirement is low. If the mobile unit 1 then receives the beacon signal with the identifier of the motor vehicle 10, a program (for example, an app) starts in the mobile unit 1. The mobile unit 1 and the motor vehicle 10 establish a communication unit (for example, WLAN), and the mobile unit 10 demands data from the door opening sensor arrangements 11 and from the further sensor arrangement 12. In parallel with this, the sensor arrangement 3 in the mobile unit 1 may be activated if this was previously deactivated. Then, if a door opening sensor arrangement 11 detects an opening of the assigned vehicle door, then the transmitter/receiver unit 14 transmits this to the mobile unit 1 together with a timestamp. The mobile unit 1 thus knows which vehicle door was opened at what point in time. Here, it is by all means possible for multiple door opening signals to be received. The mobile unit 1 then evaluates the data from the sensor arrangement 3 by the evaluation unit 2 to detect a characteristic boarding movement. If the mobile unit 1 then detects such a characteristic boarding movement, then the mobile unit 1 assigns the boarding movement, on the basis of the timestamp, to a vehicle door and thus to a vehicle seat or seat 13, and transmits its identifier with user profile and associated vehicle seat or seat 13 to the motor vehicle 10. The motor vehicle 10 receives the data and greets the user. The greeting may be configured such that the user is addressed at his or her assigned seat. In the case of an incorrect assignment by the mobile unit 1, the assignment may then be manually corrected if required. If the assignment is correct, the settings of the user profile are implemented for the seat 13. The assignment may in this case be checked for plausibility by the closing of a vehicle door (sensed by the door opening sensor arrangement 11) and the data from the further sensor arrangement 12, in particular if multiple boarding is performed by multiple users in parallel.

FIG. 3 illustrates the pitch angle γ versus the time, wherein the solid line shows a profile of a boarding movement in which the mobile unit 1 is carried in the left-hand trouser pocket and boarding is performed on the driver's side. Correspondingly, the dashed line shows a profile of a boarding movement in which the mobile unit 1 is carried in the right-hand trouser pocket and boarding is performed on the driver's side. The sitting-down movement can be clearly identified as a change in the pitch angle γ from −90° previously to approximately 0° subsequently. It can furthermore be seen that the pitch angle at the left leg (solid line) exhibits a temporary clear overshoot into the positive range. This characteristic peak arises when, after sitting on the vehicle seat, the left leg is pulled into the motor vehicle, and this generally allows statements to be made regarding which leg is facing toward or away from the motor vehicle. By contrast, if the mobile unit 1 is carried in a handbag (identifiable, for example, by a pendulum movement of the pitch angle), then it is the case that the setting-down movement of the bag (z component) is characteristic.

Figure 4:
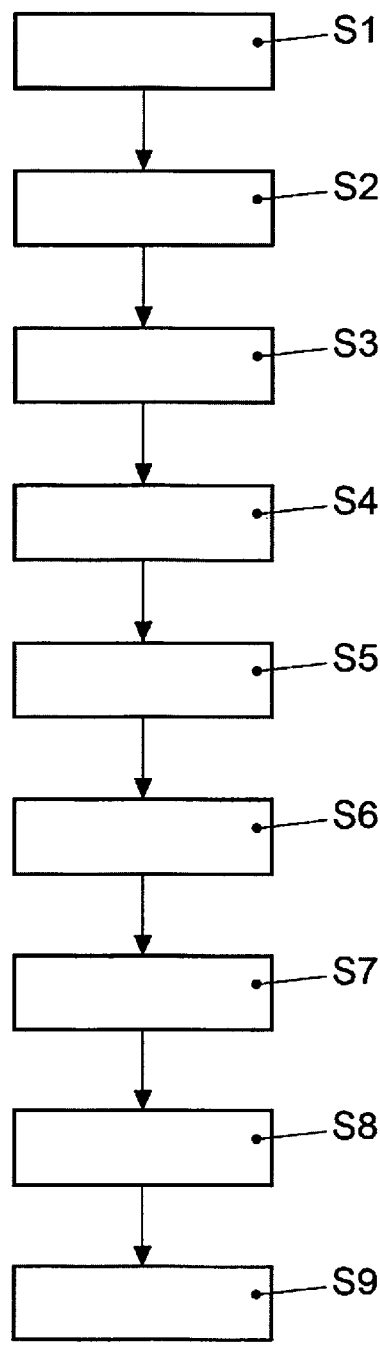
FIG. 4 shows a flow diagram of the method.

FIG. 4 shows a flow diagram of a method for the assignment of a user profile to a vehicle seat. In a first method operation at S1, the motor vehicle periodically transmits a beacon signal. In a second method operation at S2, the mobile unit receives the beacon signal and starts an app. In a third method operation at S3, the mobile unit and the motor vehicle establish a communication connection. In a fourth method operation at S4, the mobile unit demands a door opening signal and possibly data from further sensor arrangements. In a fifth method operation at S5, the motor vehicle transmits a signal to the mobile unit with a timestamp when the opening of a door has been sensed. In a sixth method operation at S6, the mobile unit commences the evaluation of the data from the sensor arrangement for the detection of at least one translational and/or rotational degree of freedom for the detection of a boarding movement. In a seventh method operation at S7, the mobile unit detects the boarding movement and, in an eighth method operation at S8, the mobile unit transmits its identifier with user profile and assigned seat to the motor vehicle. In a ninth method operation at S9, the motor vehicle greets the user in his or her seat and sets or performs the settings of the user profile.

The method has been described here with the evaluation taking place entirely in the mobile unit. It is however possible for the evaluation to be performed entirely in the motor vehicle, or for the evaluation to be distributed between mobile unit and motor vehicle.

LIST OF REFERENCE DESIGNATIONS

1 Mobile unit
2 Evaluation unit
3 Sensor arrangement
4 Memory
5 Transmitter/receiver unit
10 Motor vehicle
11 Door opening sensor arrangement
12 Further sensor arrangement
13 Seat
14 Transmitter/receiver unit
S1-S9 Method operations

The invention claimed is:

1. A method for assigning a user profile of a user to a seat in a transportation vehicle, by at least one mobile unit, wherein the mobile unit has at least one identifier and a sensor arrangement for detecting at least one translational and/or rotational degree of freedom, the method comprising:
   transmitting a trigger signal to the mobile unit by the transportation vehicle;
   receiving the trigger signal by the mobile unit;
   in response to receiving the trigger signal, activating the sensor arrangement for detection, and detecting data including at least one translational and/or rotational degree of freedom using the sensor arrangement;
   transmitting, by the transportation vehicle, an indication of a door opening event including a timestamp;
   transmitting, by the mobile unit, the identifier to the transportation vehicle;
   evaluating, in the mobile unit or the transportation vehicle, the data from the sensor arrangement to determine whether a boarding movement into the transportation vehicle is occurring as a boarding event; and
   assigning, based on the detected data from the sensor arrangement and the timestamp, by the transportation vehicle or the mobile unit, the determined boarding event to a seat in the transportation vehicle assigned to a vehicle door, wherein the user profile is then assigned to the seat.

2. The method of claim 1, further comprising:
   the transportation vehicle transmitting a trigger signal to the mobile unit; and
   in response to the trigger signal, the mobile unit activates the sensor arrangement for the detection of the data including at least one translational and/or rotational degree of freedom and/or commences the evaluating for the detection of a boarding movement.

3. The method of claim 1, wherein the evaluating further comprises evaluating at least two rotational degrees of freedom as part of the evaluating whether a boarding movement is occurring.

4. The method of claim 1, wherein the user profile is stored in the mobile unit and is transmitted to the transportation vehicle.

5. The method of claim 1, further comprising, after evaluation of whether a boarding movement is occurring, the data from the sensor arrangement for the detection of at least one translational and/or rotational degree of freedom are used to evaluate and detect whether a movement of the user to a different seat in the vehicle.

6. A mobile unit, comprising:
   at least one identifier; and
   a sensor arrangement for the detection of at least one translational and/or rotational degree of freedom, the sensor arrangement being configured to be activated as a responsive action to a trigger signal from a transportation vehicle,
   wherein the mobile unit sends the identifier to the transportation vehicle responsive to the trigger signal from the transportation vehicle, and receives an indication of a door opening event including a timestamp from the vehicle, and
   wherein the mobile unit determines a boarding movement into the transportation vehicle based on the data from the sensor arrangement and the timestamp, and transmits the determination of the boarding movement to a transportation vehicle, or transmits the data from the sensor arrangement to the transportation vehicle.

7. The mobile unit of claim 6, wherein the mobile unit receives the trigger signal and, based on the trigger signal, activates the sensor arrangement and/or the evaluation for the determination of a boarding movement.

8. The mobile unit of claim 6, wherein the sensor arrangement detects at least two rotational degrees of freedom, which are used for the determination of the boarding movement.

9. The mobile unit of claim 6, wherein the mobile unit has a user profile,
   wherein the mobile unit transmits the user profile to the motor vehicle.

10. A transportation vehicle, comprising:
    a trigger unit configured to send a trigger signal to a mobile unit to activate a sensor arrangement as a response action to the trigger signal to detect at least one translational and/or rotational degree of freedom,
    a door opening sensor arrangement adapted to determine occurrence of a door opening event and a timestamp,
    wherein the transportation vehicle receives an identifier of a mobile unit of the user,
    wherein the transportation vehicle receives, from the mobile unit, data from a sensor arrangement for detecting at least one translational and/or rotational degree of freedom and determines a boarding movement based on the data, or receives a detected boarding movement from the mobile unit,
    wherein the transportation vehicle transmits an indication of the door opening event and the timestamp from the door opening sensor arrangement to the mobile unit and receives the assignment of user profile and seat from the mobile unit.

11. The transportation vehicle of claim 10, wherein the transportation vehicle transmits the trigger signal to the mobile unit and in response to the trigger signal, the mobile unit activates the sensor arrangement for the detection of the data including at least one translational and/or rotational degree of freedom.

12. The transportation vehicle of claim 10, wherein the transportation vehicle determines whether a boarding movement is occurring by evaluating at least two rotational degrees of freedom.

13. The transportation vehicle of claim 10, wherein the user profile is stored in the mobile unit and is transmitted to the transportation vehicle.

14. The transportation vehicle of claim 10, wherein, after determination of whether a boarding movement is occurring, the transportation vehicle determines whether a movement of the user to a different seat occurs.

* * * * *